Figure 1:
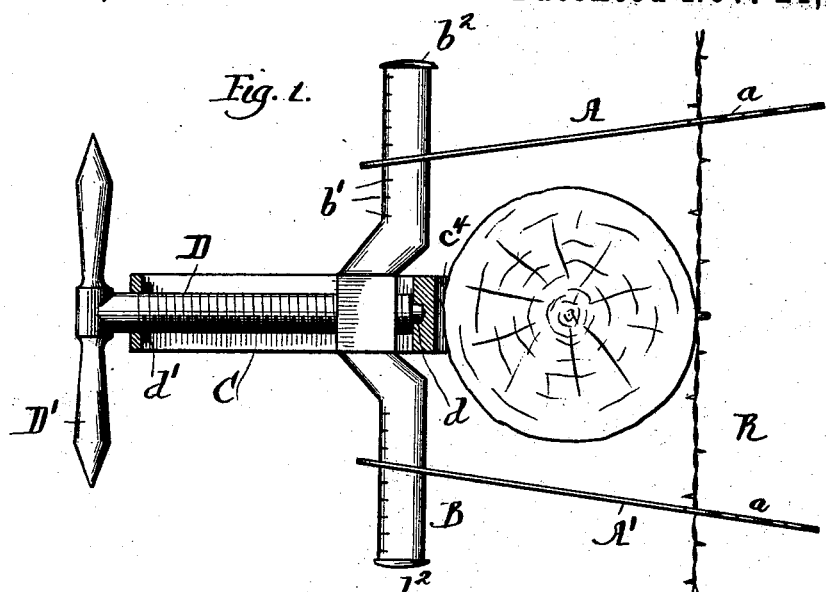

(No Model.)

D. W. HOUSLEY.
APPARATUS FOR TAKING UP THE SLACK OF WIRE FENCES.

No. 509,034. Patented Nov. 21, 1893.

UNITED STATES PATENT OFFICE.

DANIEL W. HOUSLEY, OF HEPLER, KANSAS.

APPARATUS FOR TAKING UP THE SLACK OF WIRE FENCES.

SPECIFICATION forming part of Letters Patent No. 509,034, dated November 21, 1893.

Application filed April 24, 1893. Serial No. 471,721. (No model.)

*To all whom it may concern:*

Be it known that I, DANIEL W. HOUSLEY, a citizen of the United States, residing at Hepler, county of Crawford, and State of Kansas, have invented certain new and useful Improvements in Apparatus for Taking Up the Slack of Fence-Wires, of which I do declare the following to be a full, clear, and exact description, reference being had to the accompanying drawings, forming part of this specification.

My present invention has for its object to provide improved means whereby, when the wires of barbed wire fences and the like become slack incident to the changes of temperature or to severe strain, such wires can be readily tightened. With wire fences, particularly such as are formed of twisted strands, it is found that in the cold weather the wires contract and in warm weather the wires expand and consequently leave the strands in a slack condition. So also, it frequently happens that under severe strains, such as are occasioned by animals pressing against the wires or by persons climbing over the same, the wires become so stretched or loosened, as to allow too great a space between the strands of the fence. By my present invention, the slack of the wire strands can be readily taken up at any desired point or points and this too, without the necessity of employing costly clamps or other devices for retaining the wires after the slack has been so taken up.

My invention consists in the novel features of construction hereinafter described, illustrated in the accompanying drawings, and particularly pointed out in the claims at the end of this specification.

Figure 1 is a plan view (parts being shown in section), of a wire tightener embodying my invention, the tightener being shown in position against a fence post for taking up the slack of the fence wire. Fig. 2 is a view similar to Fig. 1, showing the positions of parts after the slack of the fence wire has been taken up. Fig. 3 is a view in side elevation of my improved wire tightener, a cross bar being shown in section. Fig. 4 is a view in cross section on line 4—4 of Fig. 3.

In the preferred embodiment of my invention, which is that illustrated in the accompanying drawings, the wire tightener is shown as comprising mechanism for engaging the fence wire consisting of two arms A and A' that are furnished with hooks $a$, each of the arms being preferably provided with a series of hooks so that the tightener can be more readily used with different sizes of fence posts. The arms A and A' are held at a distance apart to enable them to straddle the fence post and preferably these arms are carried by a cross bar B as shown. This cross bar B passes through a rest or frame C, the feet $c$ of which will bear against the fence post, and this rest C serves also to carry the mechanism whereby the shifting of the engaging arms A and A' is effected. This shifting mechanism in the construction shown, consists of a screw D that is held between the sides $c'$ of the rest or frame C and passes through a perforation in the cross bar $c^2$ of the frame. The lower end of the screw D is preferably reduced as at $d$ and sits within a socket in the base of the rest or frame C, while the opposite end of the screw is retained in place within the frame by means of a pin $d'$. The outer end of the screw D is furnished with a handle D' whereby the screw can be turned. The cross bar B is provided with a threaded perforation through which the screw D passes, so that as the screw is turned a back and forth movement of the cross bar and consequently of the engaging arms A and A' can be effected.

In the preferred form of my invention, the engaging arms A and A' are mounted upon the free ends of the cross bar B in manner permitting them to move laterally upon such bar, in order to enable the arms readily to straddle fence posts of different sizes. Preferably also, the bar B has its ends formed with notches $b'$ in order to enable the arms A and A' to be placed at any desired point and be there retained against slipping, under the strain incident to tightening the wire. The arms A and A' are preferably formed with the perforations $a'$ at their ends, in order to enable these arms to be shifted upon the ends of the bar B, and the ends of the bar will be furnished with the heads or projections $b^2$ to prevent the arms A and A' slipping from off the ends of the bar B. It will be observed that the perforations $a'$ of the arms A and A' are slightly larger than the bar B, the purpose of this being to allow a certain degree of lateral and vertical movement to the arms A and A'. This lateral movement is especially desirable, since as the fence wire R is being tightened or crimped around the fence post, the free ends of the arms A and A', which are in engagement with the fence wire, will draw inward toward the post, as shown in Fig. 2. I prefer also to form the end portions of the bar B of oval or oblong cross section, so as to prevent the complete outward dropping of the arms A and A' and so insure that the arms A and A' shall be in position to more readily engage the fence wire when the foot $c$ of the rest or frame C is set against the fence post. The lower part of the foot $c$ of the rest C is formed with a cut-away space $c^4$, in order to permit the stay wire S to pass between the foot $c$ and the fence post.

From the foregoing description it will be seen that when the fence wire is to be tightened at any desired point, the foot $c$ of the rest or frame C will be placed against the fence post and the fence wire will be placed in engagement with the hooks $a$ of the arms A, as seen in Fig. 1. At such time the stay wire S will preferably be within the space $c^4$ at the base of foot $c$ of the rest or frame C and in readiness to be looped around the fence wire when the slack of such wire has been taken up. The screw D will now be turned by the handle D' so as to draw backward the cross bar B and thus shift the arms A and A' until the fence wire is so far crimped around the fence post as to take up the slack of the wire, as seen in Fig. 2. The ends of the stay wire S will then be coiled around the fence wire, in order to retain the fence wire securely in crimped position, after which the tightener can be removed for further use. In practice, the arms A and A' will have their free ends spread outwardly somewhat, at the time when they are placed in engagement with the fence wire, as shown in Fig. 1 of the drawings, but as the wire is tightened, by reason of the turning of the screw, these arms A and A' will be drawn toward the post as shown in Fig. 2 of the drawings.

It is manifest that the details of construction above set out may be varied within wide limits without departing from the spirit of the invention and to such details, therefore, I do not wish the invention to be understood as restricted.

Having thus described the invention, what I claim as new, and desire to secure by Letters Patent, is—

1. A wire tightener comprising the combination of arms arranged at a distance apart to engage the wire on opposite sides of a post, a screw for shifting said arms and a rest for said screw, substantially as described.

2. A wire tightener comprising the combination of arms arranged at a distance apart to engage the wire on opposite sides of a post, a bar to which said arms are connected, and a screw for shifting said bar and said arms, substantially as described.

3. A wire tightener comprising the combination of arms arranged at a distance apart to engage the wire on opposite sides of a post, a transverse notched bar whereon said arms are adjustably sustained, and mechanism for shifting said arms to crimp the wire about the post, substantially as described.

4. A wire tightener comprising the combination of arms A and A' provided with hooks to engage the wire on opposite sides of the post, a cross-bar B to which said arms are connected, a rest or frame C that serves to carry said cross-bar, and a screw D mounted in said frame C for shifting said cross-bar, substantially as described.

DANIEL W. HOUSLEY.

Witnesses:
GEORGE P. FISHER, Jr.,
FRED GERLACH.